United States Patent [19]

Marks

[11] Patent Number: 4,677,326
[45] Date of Patent: Jun. 30, 1987

[54] ELECTROTHERMODYNAMIC POWER CONVERTER WITH CONVERGING FLOWS

[76] Inventor: Alvin M. Marks, c/o Advanced Research Development Inc. 359 R Main St., Athol, Mass. 01331

[21] Appl. No.: 904,919

[22] Filed: Sep. 8, 1986

Related U.S. Application Data

[63] Continuation-in-part of Ser. No. 574,374, Jan. 27, 1984, Pat. No. 4,617,483.

[51] Int. Cl.$^4$ .............................................. H02N 1/00
[52] U.S. Cl. ........................................ 310/10; 310/11
[58] Field of Search ................ 310/10, 11, 300, 308, 310/309

[56] References Cited

U.S. PATENT DOCUMENTS

| | | |
|---|---|---|
| 3,443,129 | 5/1969 | Hammitt ............................... 310/11 |
| 3,878,410 | 4/1975 | Petrick et al. ......................... 310/11 |
| 4,395,648 | 7/1983 | Marks .................................... 310/10 |
| 4,523,112 | 6/1985 | Marks .................................... 310/10 |

Primary Examiner—Donovan F. Duggan

[57] ABSTRACT

An electrothermodynamic (ETD) generator and a compressor is described for use in a Marks/Ericsson Cycle. New equations are derived based on varying the electric charge distribution along the flow axis and new principles based thereon are used in the generator design.

1 Claim, 9 Drawing Figures

ELECTROTHERMODYNAMIC POWER CONVERTER WITH CONVERGING FLOWS

RELATED CASES

This invention is a continuation in part of application Ser. No. 574,374 filed Jan. 27, 1984 now U.S. Pat. No. 4,617,483 by Alvin M. Marks, "ETD Generator with Converging Flows." U.S. Pat. No. 4,395,648 is incorporated herein by reference.

FIELD OF THE INVENTION

Figure 3:
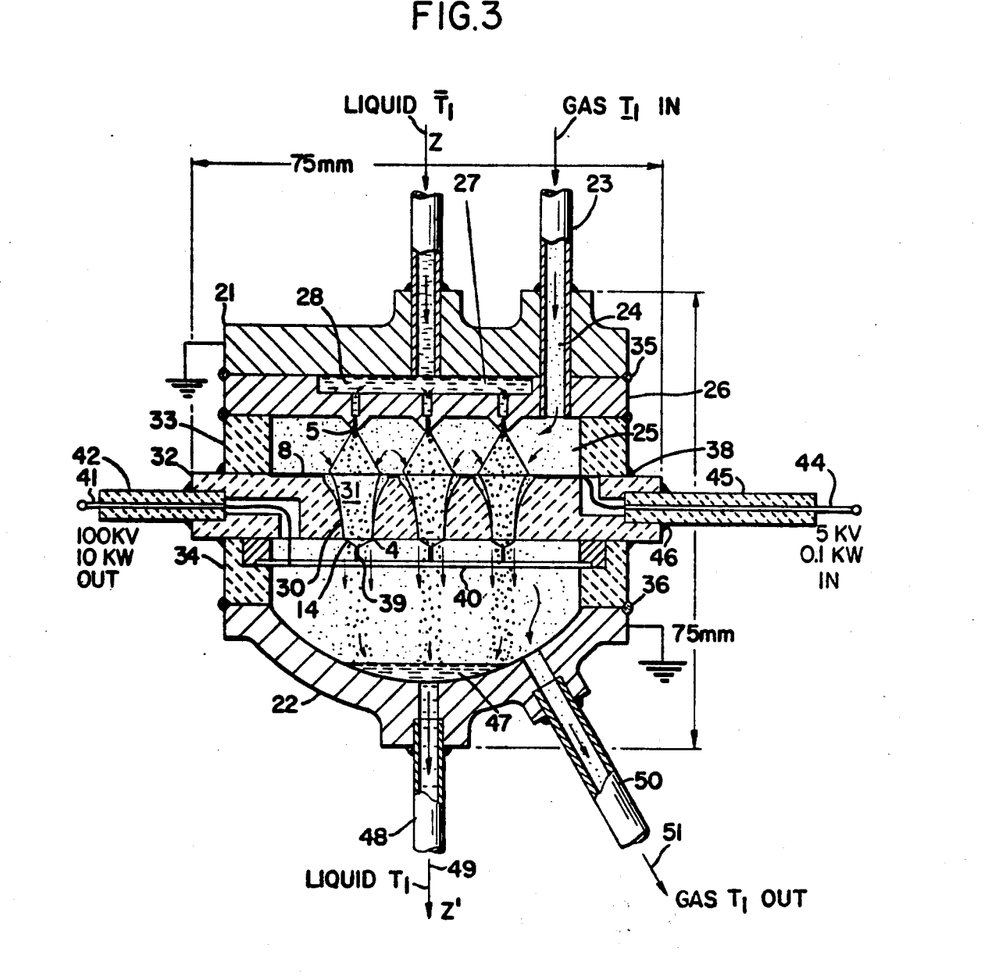
FIG. 3 shows a cross-sectional view of the 84-1 ME electrothermodynamic generator comprising a 9 element array.

A charged aerosol whose charge distribution varies along the flow axis is discussed, by means of which several orders of magnitude of increased electric power and current and decreased voltage is obtained in converting heat/kinetic power to electric power. A charged liquid tin droplet/nitrogen aerosol is used for heat/electric power conversion at about 1800° K. A charged water droplet/nitrogen aerosol is used in the electrothermodynamic compressor at 300° K. This Marks/Ericsson Cycle has a theoretical efficiency of 83%, and a practical efficiency of 60% to 70%. Other cycle components are not here considered. This new ETD generator is generally know as model 84 ME; FIG. 3 herewith showing Model 84-1 ME, and FIG. 9 herewith showing Model 84-2 ME.

BACKGROUND AND PRIOR ART

The background [1] and bibliography [2] of electrothermodynamic (ETD) generators has previously been given. This invention results from further studies with previously described Methods III [3] and IV [4].

DESCRIPTION

Figure 1:
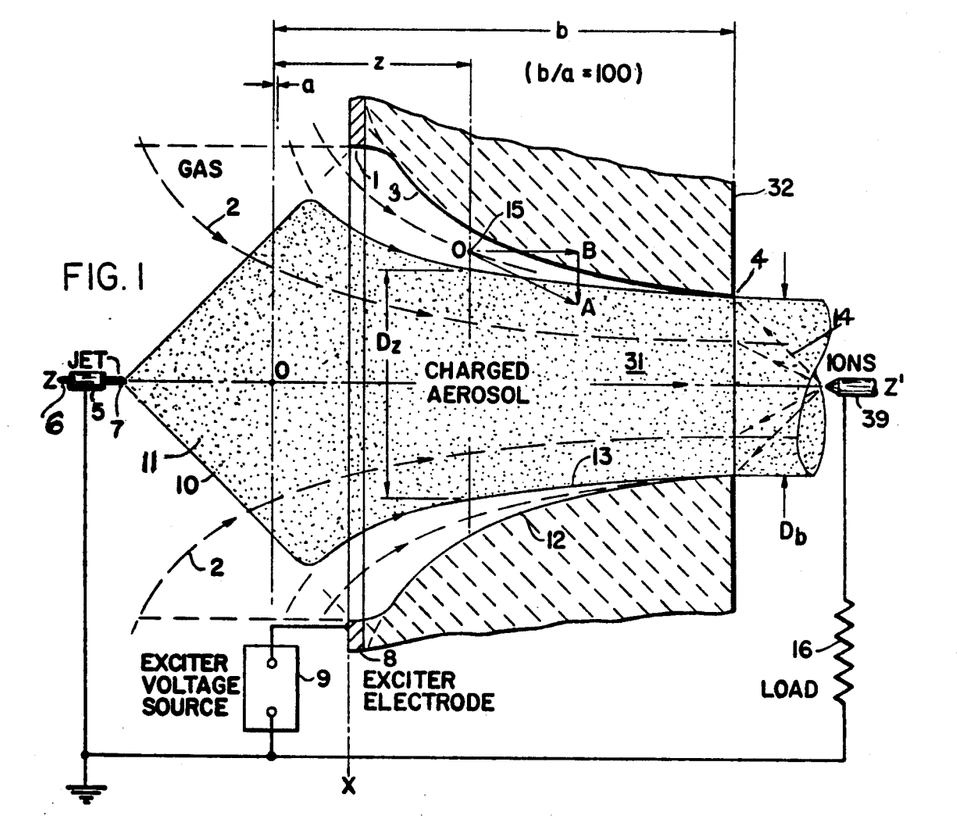
FIG. 1 shows a cross section of the 84 ME electrothermodynamic generator, a diagram of the electrical connections, the outer curve for the surface of the converging duct, and the inner curve for the surface of the charged aerosol-gas.
Figure 2:
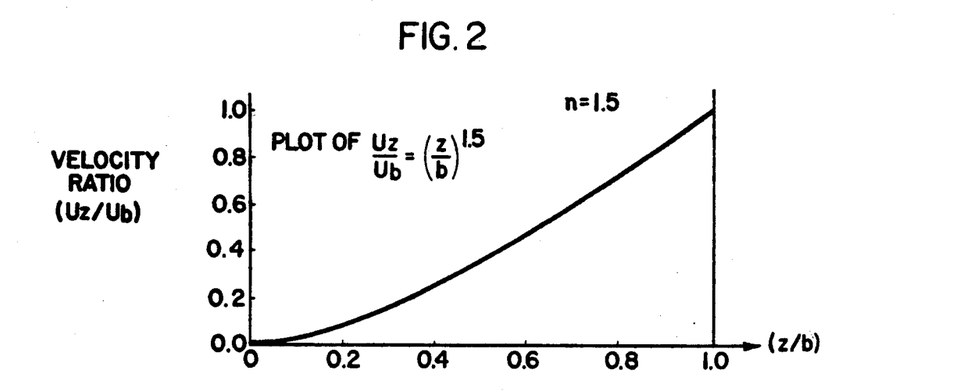
FIG. 2 shows a graph of velocity ratio ($U_z/U_b$) vs. distance ratio (z/b).

IN FIG. 1, a straight duct 1 contains a flowing as 2 passing into a converging duct 3 and through orifices 4. A small diameter tube 5 within the duct 1 contains a flowing conductive liquid 6, such as molten tin, Wood's metal, mercury, water, an alcohol, etc. which issues as a liquid jet 7. A voltage source 9 applies an electric field between the jet 7 and the exciter electrode 8. The liquid jet breaks into an expanding cone 10 comprising a large number of small diameter charged liquid droplets 11. The charged aerosol has a diameter $d_a$, less than the duct diameter $D_a$, at z=a. Duct 3 converges along an outer curve 12. The charged aerosol expands to diameter $d_a$ at z=a, and converges along an outer surface 13, which nests within the duct surface 12. The converging gas stream line has a velocity vector OA, which is resolved into an axial vector velocity component OB, and a normal vector velocity component BA directed towards the z axis, which causes the charged aerosol to be pinched toward the duct axis; and separate from the duct wall 3. This avoids wetting the wall and causing a "short". Duct convergence causes the charged aersol-gas velocity to increase.

Referring to FIG. 3, each converging duct 30 generates about 1100 watts; the total output is about 10KW@100,000 volts and 0.1 amp D.C. The generator, one component in a Marks/Ericsson Cycle [4], is maintained at its operating temperature $T_1$ in a furnace; for example 1800° K.

The generator comprises two stainless steel end plates 21 and 22 which are at ground potential. An inlet pipe 23 supplies a gas; for example, air, nitrogen, or other suitable gas or mixture of gases through the entrance port 24 of the end plate 21 to a common chamber 25 in which the gas is temporarily held at a supply pressure, for example 120 atmospheres and at $T_1=1800°$ K. The end plate 21 is welded to an intermediate plate 26, which contains a chamber 27 between the two plates. The chamber 27 receives the conductive liquid 28, which enters the chamber at a temperature $T_1$; for example 2400° K., and a pump pressure of for example 130 atmospheres. The end plates hold together all the members including the insulating discs, 32, 33 and 34.

The electrothermodynamic power conversion occurs in the ducts 30 which contain charged aerosols 31 within the duct surfaces, formed in a 10 mm thick sapphire plate 32. Sapphire is a preferred insulator, non-reactive at these temperatures. At lower temperatures other materials such as quartz may be used, Sapphire-metal joints have been described [5].

The charged aerosols 31 are discharged by ions of opposite sign 14 emitted from points 39. After discharge the neutral droplets no longer repel each other, and coalesce into the liquid which is circulated through the liquid pump and heating coils back to the generator at 28.

The gas enters the generator at pressure $p_1$ and temperature $T_a=T_1$ through tube 23 in end plate 21; and exits through tube 50 as a gas stream, now separated from the liquid, at pressure $p_2$ and temperature $T_b$. Each duct may produce about 1100 watts; a total of about 10 KW for 9 ducts contained within a 7.5 cm cube.

The electrothermodynamic cycle is substantially reversible.

About 17% of the electric power from the ETD Generator is supplied to the ETD compressor to compress the charged aerosol gas from $p_2$ to $p_1$ cooling it almost isothermally at 300° K. by the charged water droplets; and increasing its velocity and kinetic power. After discharging the water droplets, the liquid is collected and sent to a heat exchanger heat-sink.

Gas is supplied to the ETD Compressor at pressure $p_2$ from the heat exchanger. Since its absolute temperature has decreased by the ratio 1800/300=6; the isothermal work done on the gas is decreased. If the ETD Generator has 12 modules producing 12 KW at 1800° K., the compact compressor has 2 modules using 2 KW.

TABLE OF SYMBOLS

| Symbol | Description | Units |
|---|---|---|
| Symbol | | |
| A | Area | $m^2$ |
| C | Specific Heat | joules/kg °K. |
| D | Diameter of Duct | m |
| E | Electric Field Intensity | v/m |
| I | Current | amps |
| J | Exponent of area for the Duct Surface | |
| K | A Constant | |
| L | Length along Conversion Space = b-a | m |
| M | Mach No. | |
| N | Number | |
| P | Power | watts |
| R | Gas Constant - see constants, values of; a ratio | |
| T | Temperature | °K. |
| U | Velocity | m/s |
| V | Potential, electric | volts |
| a | Distance from origin at z = a | m |
| b | Distance from origin at z = b | m |
| d | Diameter of Charged Aerosol | m |
| e | Electron Charge, see constants | c |
| f | A Factor | |
| j | Exponent of (z/b) for cross-sectional area of charged aerosol | |
| k | A Constant | |
| m | Mass | Kg |
| n | Exponent of (z/b) for velocity | |
| p | Pressure | $N/m^2$ |
| r | Radius | m |
| z | A distance along the flow axis from origin | m |
| V | Volume | $m^3$ |
| α | $\dot{m}_o/\dot{m}_g$ | |
| δ | Density | $Kg/m^3$ |
| $δ_r$ | Relative density ($δ/δ_1$) at 273° K. | |
| γ | Ratio of specific heats $c_p/c_v$ for gas | |
| ρ | Electric charge density | $c/m^3$ |
| η | Efficiency $P_e/P_q$ | |
| ζ | Electric field ratio ($E/E_c$) at incipient breakdown | |
| Ω | Molecular weight | |
| χ | Voltage ratio $E_a/E_c$ | |
| χ̄ | χ/ζ voltage ratio maximum | |
| Γ | $χ/ζ^2$ power ratio maximum | |
| Δ | Increase or decrease of a value | |
| Subscripts | | |
| L | Length | |
| a | The distance z = a along conversion space z axis from origin | |
| b | The distance z = b along conversion space z axis from origin | |
| c | Constant area duct, constant velocity | |
| d | Duct | |
| e | Electric or Electron | |
| g | Gas | |
| k | Kinetic | |
| o | Droplet | |
| p | Pressure | |
| q | Heat | |
| r | Relative value | |
| s | Sonic | |
| v | Volume | |
| 1 | Air, at standard conditions, 273° K. and 1 atmos. = $1.01 \times 10^5 \, N/m^2$ | |
| Superscripts | | |
| • | Time Rate | |
| — | Maximum value. When used thus $\bar{χ}, \bar{Γ}$ these ratios are the values at incipient electric breakdown resulting from a n increase in the current by the ratio 1/ζ. | |

| Constants, Values of: | | Units |
|---|---|---|
| $K_e$ | $\frac{1}{2}(\epsilon_0 b_1^2)(\Omega_1/\delta_1)[(1/273 \times 8314)] = 4.00 \times 10^{-4}$ a constant of the electric power conversion equation | |
| $\epsilon_0$ | $8.854 \times 10^{-12}$ dielectric constant of space | f/m |
| $\delta_1$ | 1.273 density of air at 273° K. and 1 atm | $Kg/m^3$ |
| $b_1$ | $3 \times 10^6$ electric breakdown field | |

-continued
TABLE OF SYMBOLS

| | 273° K., 1 atm, air. | V/m |
|---|---|---|
| $\Omega_1$ | 28.97 average molecular weight of air | |
| R | 8314/$\Omega$, gas constant | joules/K.°-mol |
| e | 1.601 × 10$^{-19}$ electric charge of the electron | C |
| $n_k$ | 1-$(U_a/U_b)^2$ fraction of output kinetic power. | |

MATHEMATICAL PHYSICS

Differential Equation of the Conversion Space

The generalization of an earlier equation [6] uses a differential form of Gauss' equation. The charge density $\rho$ and area A varies from z=a to z=b:

$$(d/dz)(A\, dV/dz) = -A\rho/\epsilon_o \quad (1)$$

$$A_z = A_a(z/a)^j \quad (2)$$

$$U_z = U_a(z/a)^n \quad (3)$$

$$\rho_z = I/A_z U_z = (I/A_a U_a)(z/a)^{-(n+j)} = \rho_a(z/a)^{-(n+j)} \quad (4)$$

The differential equation obtained from (1)–(4) is:

$$(d/dz)[(z/a)^j(dV/dz)] = -\rho_a(z/a)^{-n} \quad (5)$$

The Electric Field and Current Ratio

The equation (5) is integrated subject to E=d/V/dz=0 at z=b. The equation for E is compared for various values of j and n to the Electric Field intensity $E_a$ at z=a, the entrance to the conversion space, for a constant velocity gas in a constant area duct using the equation $E_a$ previously derived [7]:

$$E_c = -\rho L/\epsilon_o = IL/\epsilon_o UA \quad (6)$$

$$E_b = b_1 K_a \delta_r = E_c = \overline{IL}/\epsilon_o UA \quad (7)$$

The electric field intensity ratio $\zeta_a$ at z=a is:

$$\zeta_a = E/E_a = \frac{1}{(1-n)[(b/a)-1]}[(b/a)^{1-n} - 1] \quad (8)$$

For U increasing, n>0 and (b/a)>>1; from equation (8):

$$\zeta_a = \frac{1}{(n-1)}\left(\frac{a}{b}\right) \quad (9)$$

The field ration $\zeta_a$ is small; so large currents can be sustained without electric breakdown. For velocity decreasing n<0:

$$\zeta_a = \frac{1}{(1-n)}(b/a)^{-n} \quad (10)$$

and the field ratio $\zeta_a$ is large. Hence it is preferred to use the conditions for (9). From (7) the maximum current I is limited by the breakdown field E=$E_b$. The electric field intensity at z=a is decreased by an increased velocity gradient, n>0; and from (9), the maximum current ratio is $$(1/\zeta_a) = (n-1)(b/a) \quad (11)$$

n should be as large as possible, limited by attainable values of $(U_b/U_a)$=1000. The useful maximum value of n is then, for (b/a)(=100; from (3)

$$n = \ln(U_b/U_a)/\ln(b/a) = \ln 1000/\ln 100 = 1.5 \quad (12)$$

From (3) and (11) the current ratio is:

$$1/\zeta_a = (n-1)(U_b/U_a)^{1/n} \quad (13)$$

For $(U_b/U_a)$=1000 the maximum value of 1/$\zeta_a$=63.2 at n=1.2 Hence:

$$(b/a) = \ln^{-1}(1/1.2)\ln 1000 = 316 \quad (14)$$

The variations of electric field intensity ratio $\zeta$ with (z/b), is obtained from (5) by integration subject to E=0 at (z/b)=1:

$$\zeta = \frac{1}{(n-1)[(b/a)-1]}(b/a)^{1-n-j}\left(\frac{z}{b}\right)^{-j}\left[1 - \left(\frac{z}{b}\right)^{1-n}\right] \quad (15)$$

The Electric Voltage and Voltage Ratio

The voltage V from z=a to z=b is obtained by a second integration of equation (5), from equation (15), subject to the condition V=0 at z=a.

For comparison, the voltage $V_c$ across L=b−a, for a constant area duct and a constant velocity charged aerosol, is used [7];

$$V_c = \rho L^2/2\epsilon_o = IL^2/2\epsilon_o AU \quad (16)$$

a voltage ratio x is defined, and derived from the second integration:

$$x \equiv V/V_c = \quad (17)$$

$$\left\{\frac{2}{(1-n)[(b/a)-1]^2}\right\}\left\{\frac{\left(\frac{b}{a}\right)^{2-n-j}\left(\frac{b}{a}\right)^{1-n}}{(1-j)} + \frac{1-\left(\frac{b}{a}\right)^{2-n-j}}{(2-n-j)}\right\}$$

Equation (17) simplifies for (b/a)>>1 and n>1:

$$x = [1/(1-j)(2-n-j)]\left(\frac{a}{b}\right)^{n+j} \quad (18)$$

When th current I is increased to incipient electric breakdown by the current ration 1/$\zeta_a$ from (13); then $x \equiv x/\zeta$ is the corresponding maximum voltage ratio. Hence from (13) and (18)

$$\bar{x} = [2(n-1)/(1-j)(2-n-j)]\left(\frac{b}{a}\right)^{1-n-j} \quad (19)$$

For $\bar{x} = 1$, equation (19) requires these values:

for $\bar{x}=1$, equation (19) requires values:

$$n = 1.5 \quad \bar{x} = 1 \quad (20)$$

$$\left. \begin{array}{l} j = -0.635 \\ j + n = 0.865 \end{array} \right\} \text{ for which } \Gamma = 50$$

For $\bar{x}=2$, which may be a maximum useful value:

$$n = 1.5 \quad \bar{x} = 2 \quad (21)$$

$$\left. \begin{array}{l} j = -0.85 \\ j + n = 0.65 \end{array} \right\} \text{ for which } \Gamma = 100$$

For $n = 1.2$, and $j = -0.45$, $x = 1$ and $1/\zeta = 63.2$. (22)

For all values of $\bar{x}$, $\bar{x}=1$, $\bar{x}=2$, etc., the maximum current ratio $1/\zeta$ is the same, since from (13) it depends only on the value of n.

The Electric Power and the Power Ratio

The maximum power ratio is:

$$\bar{\Gamma} = \overline{IV}/I_c V_c = x/\zeta_a{}^2 = \bar{x}/\zeta_a \quad (23)$$

The Duct Surface

The duct surface contains the flowing gas which converges toward an orifice of diameter $D_b$. Applying the continuity equation:

$$\dot{m}_g = \delta_a U_a A_a = \delta_b U_b A_b = \delta_z U_z A_z \quad (24)$$

The equation of the duct surface curve in the YZ plane is derived from (2). J for the Duct surface distinguishes it from the j used for the charged aerosol surface.

$$(D_z D_a)^2 = (A_z/A_a) = (z/a)^J = (b/a)^J (z/b)^J \quad (25)$$

$$r_z = r_b (z/b)^{J/2} \quad (26)$$

The Charged Aerosol Surface

The gas and the charged aerosol mix and flow through the same orifice. The equation of the charged aerosol surface curve is derived similarly to the derivation for the duct curve (26) using a different value of j; but with the same orifice radius $r_b$ at $z=b$:

$$r_{za} = r_b (z/b)^{j/2} \quad (27)$$

The region of the duct curve (26) from $(z/b)=(a/b)$ to $(z/b)=0.20$; and the region of the charged aerosol curve from $(z/b)=(a/b)$ to $(z/b)=0.10$ are discarded. In these regions, the curves diverge rapidly to a large value. A duct entrance diameter $D_a = 10$ mm and an orifice diameter of 3.7 mm may be used.

Uncoupled Flow

The continuity equations (24) apply only to the gas in the duct but not to the charged aerosol. By "uncoupled flow" is meant that the area exponent for the duct J and the area exponent for the charged aerosol, j, have different values; but the gas and the charged aerosol, assumed to have a charged droplet of near zero mobility, are both subject to the same velocity gradient.

FIG. 1 shows curve $r_z$ vs. (z/b) for the duct surface, and the curve $r_{za}$ vs. (z/b) for the charged aerosol surface; using $J=-1.41$ for the duct; and $j=-0.65$ for the curve of the charged aerosol surface, for $(b/a)=100$:

$$r_z = 1.85\,(z/b)^{-0.705} \quad (28)$$

$$r_{za} = 1.85\,(z/b)^{-0.325} \quad (29)$$

The velocity ratio curve of FIG. (2) is plotted from $$(U_z/U_b) = (z/b)^{1.5} \quad (30)$$

Charged Aerosol Formation

In FIG. 1, the liquid jet is at a greater temperature than the gas. The electric field breaks the jet into small droplets charged by induction, and the charged droplets mutually repel each other. A sudden expansion occurs, resulting in a large value of n at the liquid jet. The maximum voltage generated in the cone $\bar{x}=0.0125$, calculated from (19), is small, exceeded by the voltage between the exciter ring 8 and the liquid jet 7, resulting in a large current. The electric power expended in the formation of the charged aerosol is 0.1–1% of the output electric power [8].

Isothermal Heat/Electric Power Conversion

The gas and the charged aerosol droplets enter the conversion space at the same temperature. As electric power is converted from the heat content of the charged aerosol gas along the conversion space, heat power is provided by the decrease in enthalpy of the gas as it cools by a temperature $\Delta T$; that is $$\Delta\dot{Q}_1 = \dot{m}_g C_p \Delta T \quad (31)$$

and by the change in heat content of liquid droplets:

$$\Delta\dot{Q}_2 = \dot{m}_o C_o \Delta T = \dot{m}_g C_o \Delta T \quad (32)$$

The temperature changes $\Delta T$ in (31) and (32) are equal and simultaneous, and the total heat power provided to the gas is:

$$\Delta\dot{Q} = \Delta\dot{Q}_1 + \Delta\dot{Q}_2 \quad (33)$$

$$C_p = R\gamma/(\gamma-1) = (8314/\Omega)[\gamma/(\gamma-1]) \quad (34)$$

$$P_q = \Delta\dot{Q} = [\alpha C_o/R + \gamma/(\gamma-1)]\dot{m}_g R \Delta T \quad (35)$$

The heat power $P_g$ provided to the gas is converted to electric power and to kinetic power, due to velocity increase. The kinetic power is small compared to the electric power output. The temperature of the gas and the charged droplets, and the gas pressure and density decrease.

For a gas and a metal droplet which have a temperature decrease $\Delta T << T$, the expansion is polytropic, almost isothermal [9]; from (35):

$$P_q = \dot{m}_g RT \ln(p_1/p_2) = \dot{m}_g R \Delta T \left[ \frac{\alpha C_o}{R} + \frac{\gamma}{\gamma - 1} \right] \quad (36)$$

$$\ln(p_1/p_1) = \left[ \frac{\alpha C_o}{R} + \frac{\gamma}{\gamma - 1} \right] \frac{\Delta T}{T} \quad (37)$$

If the liquid tin droplet and nitrogen heat contents are equal:

$$\alpha = (R/C_o)[\gamma/(\gamma - 1)] = \frac{8314}{28 \times 218.4} \times \frac{1.4}{0.4} = 4.76 \quad (38)$$

Putting these values into (37) for $(p_1/p_2)=2$, $(\Delta T/T)=0.1$; the heat/electric power conversion is approximately isothermal; the electric power converted in a charged aerosol is [10]:

$$P_e = \tfrac{1}{2}\epsilon_o b_1{}^2 (b_g K_a)^2 \delta_r{}^2 U A \Gamma \quad (39)$$

This equation may be expressed in terms of the mass flow rate, $\dot{m}_g$ with important consequences. In (39), multiply and divide through by the density, and by R; and use the lumped constant $K_e$ to obtain:

$$\dot{m}_g = \delta A U = = \delta \dot{V}_g \quad (40)$$

$$(\delta_r/\delta) = (1/28.97)(\Omega/\delta_1)(T/273) \quad (41)$$

$$P_e = K_e(b_g K_a)^2 \dot{m}_g RT \delta_r \Gamma = 4 \times 10^{-4}(b_g K_a)^2 \dot{m}_g RT \delta_r \Gamma \quad (42)$$

The equation for electrothermodynamic power conversion is:

$$P_q = \dot{m}_g RT \ln(\delta_1/\delta_2) = P_e + P_k \quad (43)$$

In (43), $P_k$ is the heat power converted to kinetic powder, and exhausted from the orifice at $(z/b) = 1$:

$$P_k = \tfrac{1}{2}(\dot{m}_o + \dot{m}_g)(U_b{}^2 - U_a{}^2) \quad (44)$$

$$P_k = \eta_k \tfrac{1}{2}\dot{m}_g(1+\alpha)U_b{}^2; \eta_k 1 \text{ since } U_b >> U_a \quad (45)$$

The sonic velocity $U_s$ is:

$$U_s{}^2 = \gamma RT \quad (46)$$

For a charged aerosol gas, the sonic velocity if $U'_s$ $$\tfrac{1}{2}(1+\alpha)\dot{m}_g U'_s{}^2 = \tfrac{1}{2}\dot{m}_g U_s{}^2 \quad (47)$$

in terms of Mach No. M:

$$U_b = M U_s = [M/(1+\alpha)]U_s \quad (48)$$

$$P_k \tfrac{1}{2}\dot{m}_g RT \gamma M^2; \text{ since } \eta_k = 1 \quad (49)$$

From (42), (43) and (49):

$$\dot{m}_g RT \ln(\delta_1/\delta_2) = K_e(b_g K_a)^2 \dot{m}_g RT \delta_r \Gamma + \tfrac{1}{2}\dot{m}_g RT \gamma M^2 \quad (50)$$

For $p_k$ to be negligible:

$$\tfrac{1}{2}\gamma M^2 << \ln(\delta_1/\delta_2) \quad (51)$$

Subject to (51), this important criterion results:

$$\delta_r \Gamma = [1/K_e(b_g k_a)^2]\ln(\delta_1/\delta_2) \quad (52)$$

Example

Given gas: air, electric breakdown factor $$b_g k_a = 1 \text{ ambient or } 0.5 \text{ at } 1800^\circ \text{ K.} \quad (53)$$

Sonic velocity at 1800° K.

$$U_s = (\gamma RT)^{\tfrac{1}{2}} = \left(1.4 \times \frac{8314}{28.97} \times 1800\right)^{\tfrac{1}{2}} = 850 \, m/s \quad (54)$$

Orifice velocity from (48) and (54):

$$U_b = 0.2 U_s{}^1 = 0.2 \times 850/(1+4.76)^{\tfrac{1}{2}} = 70.8 \, m/s \quad (55)$$

Gas density at orifice:

$$\delta = \Omega_r \delta_1 \frac{273}{T} \quad \delta_r = 1 \times 1.273 \times \frac{273}{T} \times 20 = 3.86 \, Kg/m^3 \quad (56)$$

The mass flow rate is decreased by the charged liquid tin droplets it contains. The area of orifice, for a diameter $D_b = 3.7$ mm is:

$$A_b = \frac{\pi}{4}(3.7 \times 10^{-3})^2 = 1.075 \times 10^{-5} m^2 \quad (57)$$

$$\dot{m}_g = \delta_g A_b U_b = 3.86 \times 1.075 \times 10^{-5} \times \quad (58)$$

$$70.8 = 2.94 \times 10^{-3} \, Kg/s$$

From (43) the electric power output is $$P_e = P_q - P_k = \eta P_q = \eta \dot{m}_g RT \ln(p_1/p_2) \quad (59)$$

for $\eta = 0.94$ and $(p_1/p_2) = 2.1$: $P_k = (1-\eta)P_q = 0.06 P_q \quad (60)$ $$P_e = 0.94 \times 2.94 \times 0^{-3} \times \frac{8314}{29} \times 1800 \times \ln 2 = 1059 \text{ watts} \quad (61)$$

Using the criterion (52) to find $\delta_r$:

$$\delta_r \Gamma = [1/k_e(b_g k_a)^2]\ln(p_1/p_2) = [\tfrac{1}{4}10^4 \times 1]\ln 2.1 = 1854 \quad (62)$$

For $\Gamma = 50$, $\delta_r = 37$; and for $\Gamma = 100$, $\delta_r = 18.5$. For $\bar{x} = 1$, $\bar{x} = 2$, and $j = -0.635$ and $-0.85$ respectively; which implies that the charged aerosol surface curves vary; obtained by increasing or decreasing the exciter voltage, the load resistor 16, or the pressure ratio $p_1/p_2$.

Liquid/Gas Volume Flow Ratio

The liquid mass flow rate is:

$$\dot{m}_o = \alpha \dot{m}_g = \delta_o U_o A_o = \delta_o \dot{V}_o \quad (63)$$

$$\dot{V}_o = (\alpha/\delta_o) \dot{m}_g \quad (64)$$

From (40), (41) and (64):

$$R_{og} = [(\delta_1/\delta_o)\Omega_r 273](\alpha \delta_r/T) \quad (65)$$

For these conditions the volume ratio $R_{og}$ of liquid to gas is about 3/1000; but the mass ratio is 4.76.

Area and Diameter of the Liquid Jet Orifice $$A_o = \dot{m}_o/\delta_o U_o = \alpha \dot{m}_g/\delta_o U \quad (66)$$

Example Given: $m_g = 2.94 \times 10^{-3}$ kg/s from (58); $\alpha = 4.76$ from (38); $\delta_o = 5750$ kg/m³; and $U_o = 10$ m/s, find $A_o$ and $D_o$. From (66):

$$A_o = 4.76 \times 2.94 \times 10^{-3}/5750 \times 10 = 2.4 \times 10^{-7} \text{m}^2 \quad (67)$$

$$D_o = \left[\frac{4}{\pi} \times 2.4 \times 10^{-7}\right]^{\frac{1}{2}} = 5.5 \times 10^{-4} \text{m} = 0.5 \text{ mm} \quad (68)$$

Jet Power Input $$p_o = \tfrac{1}{2} \dot{m}_o U_o^2 = \tfrac{1}{2} \times 4.76 \times 2.94 \times 10^{-3} \times 10^2 = 0.70 \text{ watts} \quad (69)$$

Droplet Diameter and Electric Charge

For optimum mobility [11] there is 1 electron per 100 Å Dia. droplet.

$$N_e = d_o/100 = d_o \times 10^{10}/100 = 10^8 d_o \quad (70)$$

$$\dot{N} = \dot{m}_o/(\pi/6)d_o^3 \delta_o = \alpha \dot{m}_g/(\pi/6)d_o^3 \delta_o \quad (71)$$

$$I = \dot{N} N_e e = [\alpha \dot{m}_g/(\pi/6)d_o^3 \delta_o][10^8 d_o]e \quad (72)$$

$$d_o = 7.29 \times 10^{-8}(\alpha \dot{m}_g/I)^{\frac{1}{2}} \quad (73)$$

The droplet dia. $d_o$ and the number of charges $N_e$ per droplet is:

$$d_o = 7.29 \times 10^{-8}(4.76 \times 2.94 \times 10^{-3})^{\frac{1}{2}} = 0.84 \times 10^{-6} \text{m} = 0.84 \text{ μm} \quad (74)$$

$$N_e = 0.84 \times 10^{-6} \times 10^8 = 84 \text{ electrons/droplet} \quad (75)$$

DISCUSSION

Figure 4:
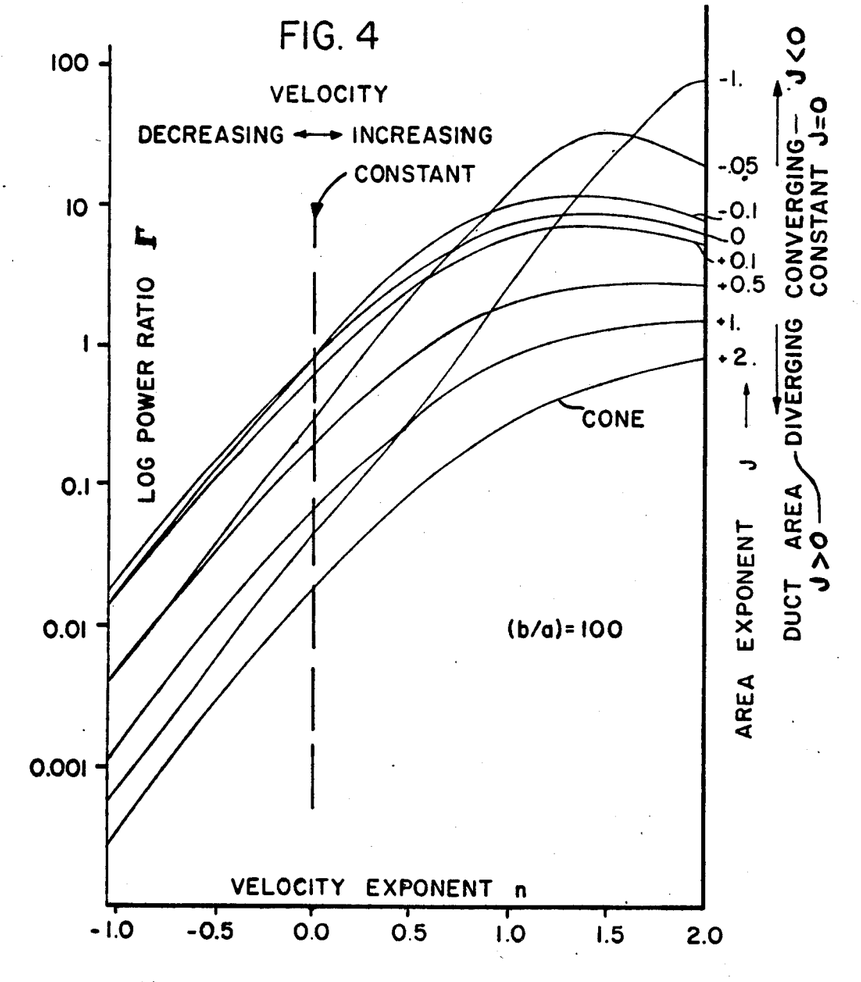
FIG. 4 shows log power ratio r versus n for various values of j.

Referring to FIG. 4, the power ratio $\bar{\Gamma}$ increases rapidly as the velocity exponent n increases, with peaks at values of n according to the value of j.

The power ratio show that in every case the peak occurs at increasing velocity ratio $n > 1.2$, for $(b/a) = 100$.

Figure 5:
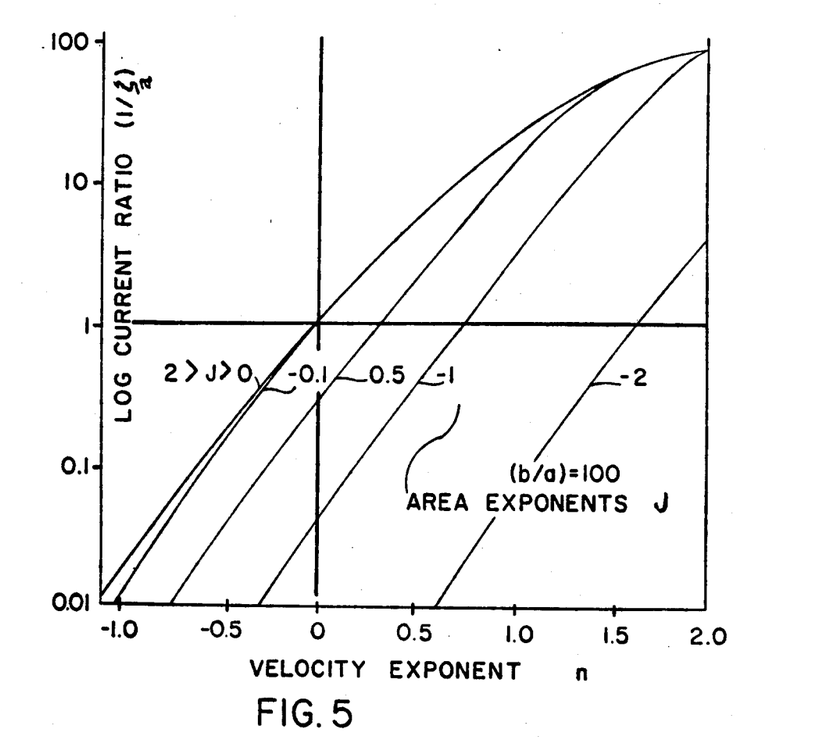
FIG. 5 shows a graph of log current ration $1/\zeta_a$ versus n for various values of j.

FIG. 5 shows that the current ratio increases with n. The increase occurs even for $n < 0$ for decreasing velocity for straight or converging ducts $j < 0$.

Figure 6:
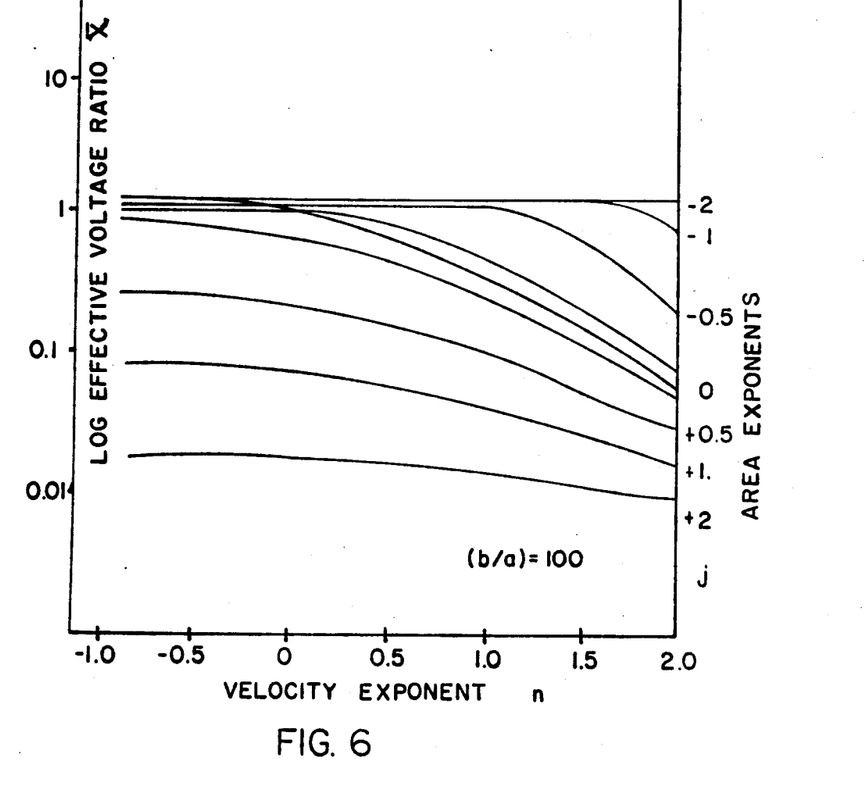
FIG. 6 shows a graph of the log of maximum voltage ratio $\bar{x}$ versus n for various values of j.

Referring to FIG. 6, the maximum voltage ratio $\bar{x}$ is small for all values of n for $j > 0.5$. For a cone $j = +2$, $\bar{x} \approx 0.01$ for all values of n. For $j = -0.5$, $\bar{x} = 1$; but $\bar{x}$ decreases for $n > 1$.

Figure 7:
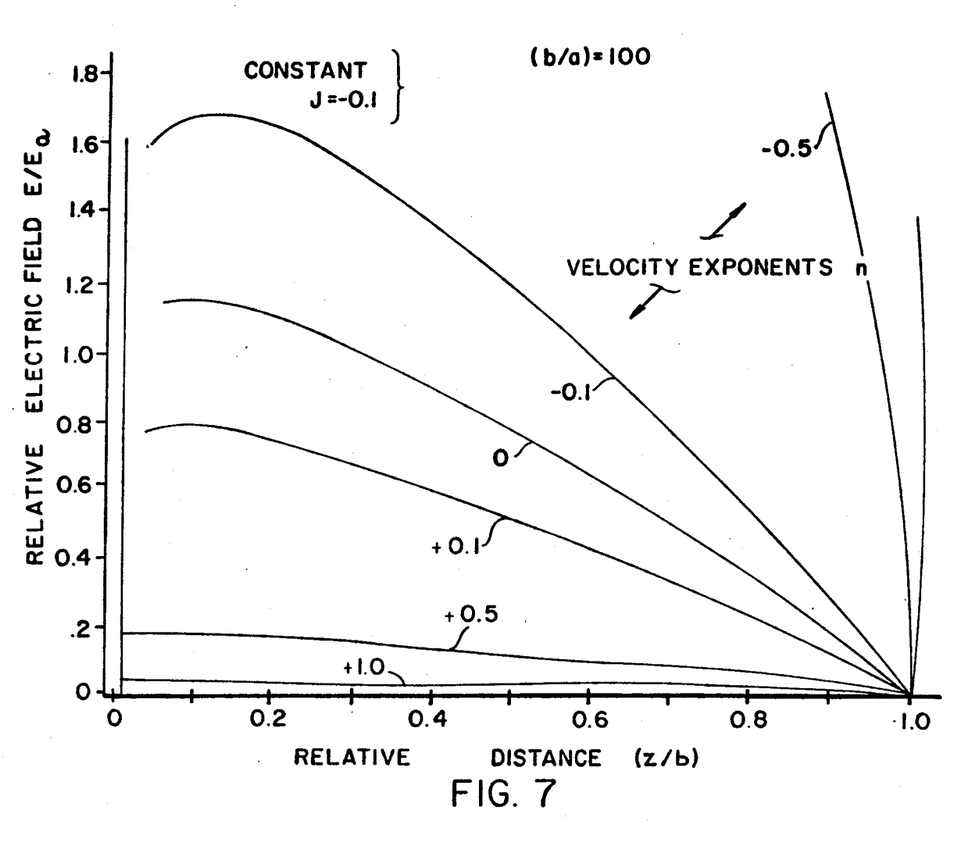
FIG. 7 shows a graph of the Electric Field Intensity Ratio ($E/E_a$) versus (z/b) for j= −0.1 and various values of n.
Figure 8:
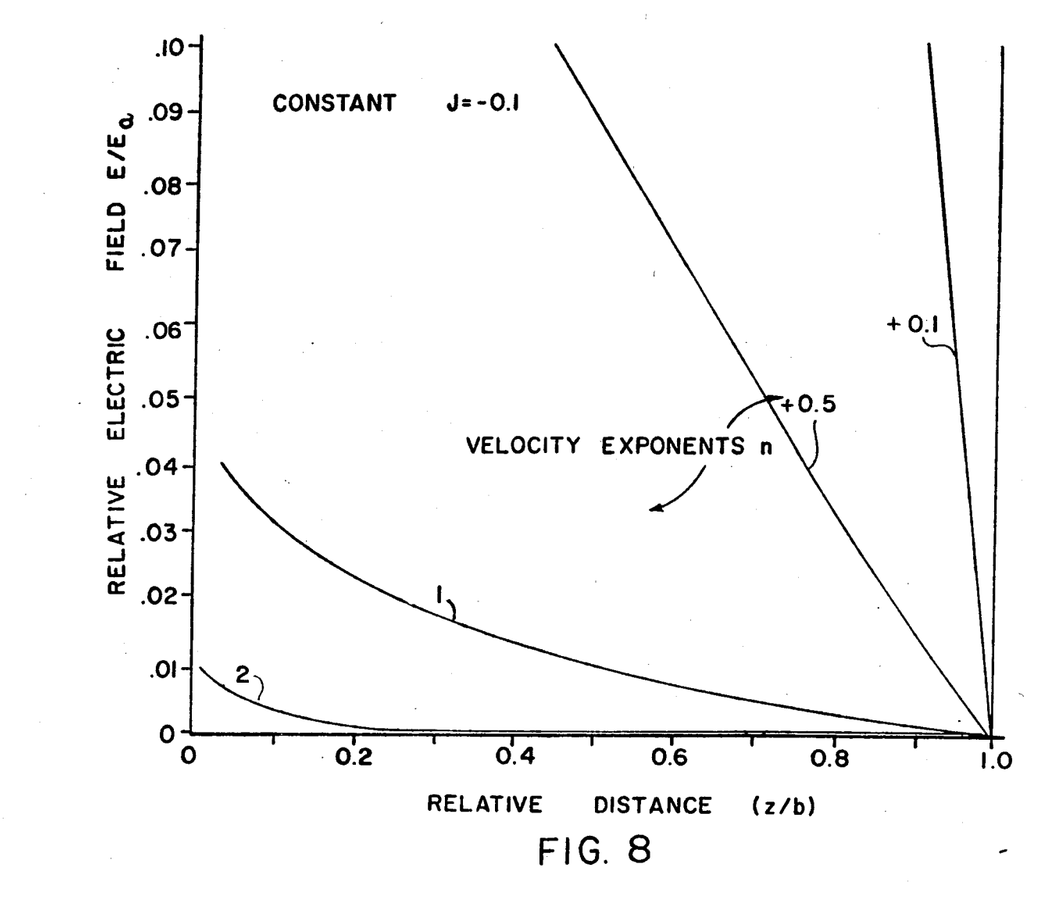
FIG. 8 is the same as FIG. 7 but is to be an expanded scale.

FIGS. 7 and 8 show the Relative Electric Field intensity ratio $(E_z/E_a)$ versus $(z/b)$ from 0 to 1 along the conversion space for $j = -0.1$, a slightly converging duct. FIG. 8 has an expanded scale.

For increasing velocity ratio $n > 0.5$ the peaks in $(E_z/E_a)$ vs. $(z/b)$ disappear, and for larger values of $n > 1.5$ are flat for all $(z/b)$. The greatest electric field intensity occurs at $z = a$ for $n > 1.5$.

Important results are summarized in Table 1 for various shapes of charged aerosol surfaces and velocity ratios.

TABLE 1

Shows Peak Power, Voltage and Current Ratios: $\bar{\Gamma}$, $\bar{x}$ and $1/\bar{\zeta}$ respectively, versus j and n for (b/a) = 100; for various ducts.

| j | n | Current Ratio $1/\bar{\zeta}$ Equ. No (11) | Volt Ratio $\bar{x}$ (19) | Power Ratio $\bar{\Gamma}$ (25) | Duct Shape |
|---|---|---|---|---|---|
| 1.99 | 4 | 297 | 0.005 | 1.50 | Exp Cone |
| 0.999 | 3.8 | 277 | 0.007 | 2.00 | Expanding |
| 0.50 | 1.6 | 63.5 | 0.055 | 3.49 | Expanding |
| 0.10 | 1.4 | 47.1 | 0.169 | 7.98 | Expanding |
| 0.00 | 1.4 | 47.1 | 0.217 | 10.2 | Straight |
| −0.10 | 1.2 | 33.0 | 0.40 | 13.3 | Converging |
| −0.50 | 1.5 | 50.0 | 1.00 | 50.0 | Converging |
| −0.50 | 1.4 | 41.9 | 0.89 | 41.9 | Converging |
| −0.999 | 2.0 | 100 | 0.99 | 99.5 | Converging |
| −1.999 | 3.0 | 198 | 1.31 | 26.1 | Hyperboloid |

For larger values of (b/a), the power peaks are greater.

Figure 9:
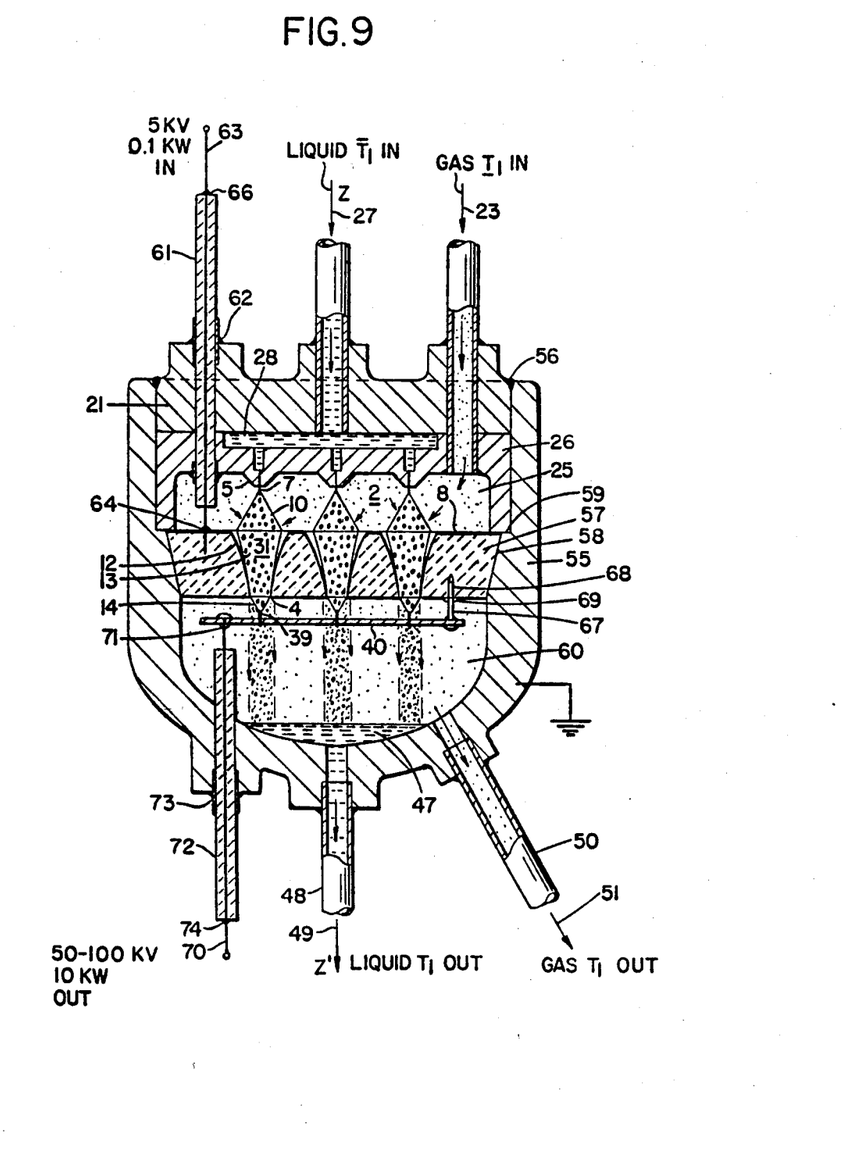
FIG. 9 shows a full scale cross-section of a Model ME 84-2 ETD Generator which comprises an improved design in a sealed metal casing.

Referring to FIG. 9, there is shown a Model 84-2 ME ETD Generator with multiple converging flows, in a 3×3 array, and generally similar to that described in a correction with FIG. 3 herein. The new structure is entirely sealed in a metal casing 55. The top end plate 21 is welded to the casing 55 at 56. The sapphire insulating disc 57 is tapered at about a 15° angle, and forms a ground joint to the metal seat 58 in the casing 56, and is held in place by the intermediate plate 26 at 59. The joint 58 may be lubricated with a high temperature sealant material such as graphite or molybdenum disulphide. The pressure differential $(p_1 - p_2)$ between the inlet chamber 25 and outlet chamber 60, aids in seating and sealing the tapered joint 58.

The exciter electrode 8 occupies a circle which has a smaller diameter than the inside diameter of the plate 8, sufficient to prevent spark breakdown. The layer 8 is coated on the top face of the sapphire disc 57. A small diameter hole (about ½ mm dia.) is bored in the sapphire disc half-way through (about 7 mm) and a platinum wire 63 is placed in the hole, and welded to the exciter electrode layer 8 at 64. The wire 63 is slipped into the sapphire tube 61. The sapphire tube 61 is previously joined at 62 to the top end plate 21 at 62 by a metal-sapphire joint. The wire 63 is then joined to the sapphire tube 61 by a sapphire metal joint 66. Power conversion occurs in the converging charged aerosols 31 within the converging duct 12 in the sapphire disc 57. The charged aerosols are discharged at the duct orifices 4 by the ions 14 emitted by the points 39 mounted in the collector electrode plate 40. The collector electrode plate 40 is supported on standoff metal rods 67 which are inserted in holes 68 drilled into the disc 58 and held by a metal sapphire joint 69. The standoff rod is also welded to the collector support plate 40; only one rod 69 is shown, but 3 or more may be employed. The collector plate, which at 50,000 to 100,000 volts is connected to the lead-out wire 70 by a weld at 71. The lead-out wire 70 passes through a sapphire tube 72. The sapphire tube 72 is sealed to the casing 55 by a sapphire/metal joint at 73. The lead-out wire 70 is sealed to the sapphire tube at its end 74. In other respects the generator is the same as that described in connection with FIGS. 1 and 3.

SUMMARY

New electrothermodynamic equations of a charged aerosol are obtained by integrating the differential form of Gauss' law: $d/dz [A(dV/dz)] = -\rho A/\epsilon_o$, where z is the distance along the flow axis from a to b and the electric charge density $\rho = I/AU$; the current I being constant, but the area A varying as the function (z/a), and the velocity U varying as the function (z/a).

Equations are derived for the electric field intensity, voltage, current and electric power output as functions of j, n, and (b/a). These equations are subjected to geometric and thermodynamic constraints yielding new and useful results, for divergent, constant area and convergent flows. Values of j, n and (b/a), and the corresponding thermodynamic variables, density, pressure and temperature are selected for an optimum configuration.

These new principles are applied to engineer a practical [12.5 KW, 50-100 KV D.C.] generator for use in a Marks/Ericsson Cycle. The D.C. power from this compact electrothermodynamic generator may be inverted to 120 volt, 60 Hz A.C. power.

REFERENCES

U.S. Pat. No. 4,395,648 issued July 26, 1983 to Alvin M. Marks.
1. Background: Cols 2-8
2. Bibliography Cols 51 and 52
3. Method III Cols 31-44 Col 32 Equ. (122) and Col 34 Equ. (145)
4. Method IV Cols. 44, 45 FIGS. 26, 28-30 incl.; Cols. 46-51 incl.
5. Col. 11, lines 38-48
6. Col. 32, Equ. (122)
7. Col. 52 ref. 7 also see Col 4 lines 10-30
8. Bottom Col 4, top Col 5
9. Col. 46, Equ. (197)
10. Col. 34, Equ. (145)
11. Col. 52, Refs. 7, 26

What I wish to claim is:

1. As an article of manufacture, an electrothermodynamic generator for the substantially isothermal conversion of the internal heat power of a flowing charged aerosol gas to electric power, a source of gas, said gas entering said generator at a temperature $T_1$ and pressure $p_1$ a gas source, a duct connected to said gas source, said duct having a flow axis in the Z direction, said duct converging from an entrance diameter $D_a$ at $Z=a$ to an exit orifice in said duct having a diameter $D_b$ at $Z=b$, a source of conductive liquid at a pressure and temperature exceeding that of the said gas, a minor orifice for said liquid located on said axis upstream from said duct entrance, said conductive liquid issuing as a jet from said minor orifice, an exciter electrode located at the said duct entrance, an exciter electric potential source, said potential source being connected across said conductive liquid and said exciter electrode to cause charged aerosol droplets to form from said liquid jet between said minor orifice and said exciter electrode, a discharge electrode located downstream from the said exit orifice, which injects ions of opposite sign into said charged aerosol, the heat content of said charged aerosol droplets being at least equal to the heat content of the gas in which it is contained, constituting an internal heat source to maintain the charged aerosol gas at nearly constant temperature, said converging duct causing the velocity and kinetic power of said gas-charged aerosol to increase as it moves along the flow axis from $Z=a$ to $Z=b$; said gas decreasing in pressure from $p_1$ at $Z=a$ to $p_2$ at $Z=b$, the ratio of temperature decrease $\Delta T$ to the absolute Temperature $T_1$ being less than about 0.1, whereby the charged aerosol gas almost isothermally converts its heat power to electric power, said kinetic power being a small fraction of said electric power; a load resistor, said load resistor being connected between the terminals of said discharge electrode and said conductive liquid source, said electric power being delivered to said load, a sealed metal enclosure, all said elements except said terminals and said load being contained within said enclosure, an insulating plate within said enclosure, said plate containing a plurality of converging ducts, and separating the inlets and outlets of said ducts.

* * * * *